E. G. HOPP.
MAIL SORTING, POSTMARKING, AND STAMP CANCELING DEVICE.
APPLICATION FILED FEB. 11 1914.
1,217,092.
Patented Feb. 20, 1917.
5 SHEETS—SHEET 1.
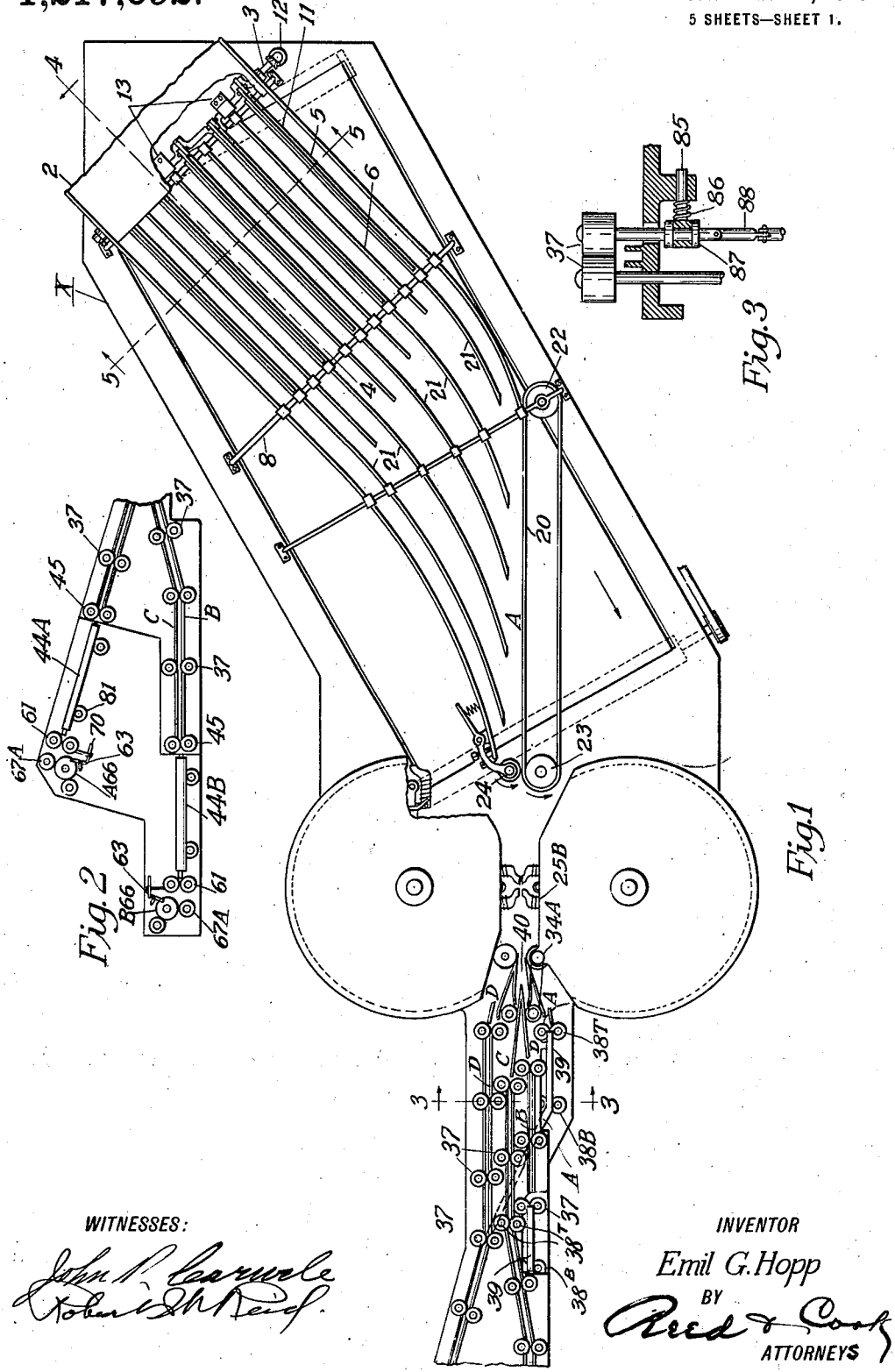
WITNESSES:
INVENTOR
Emil G. Hopp
BY
ATTORNEYS E. G. HOPP.
MAIL SORTING, POSTMARKING, AND STAMP CANCELING DEVICE.
APPLICATION FILED FEB. 11, 1914.
1,217,092.
Patented Feb. 20, 1917.
5 SHEETS—SHEET 3.
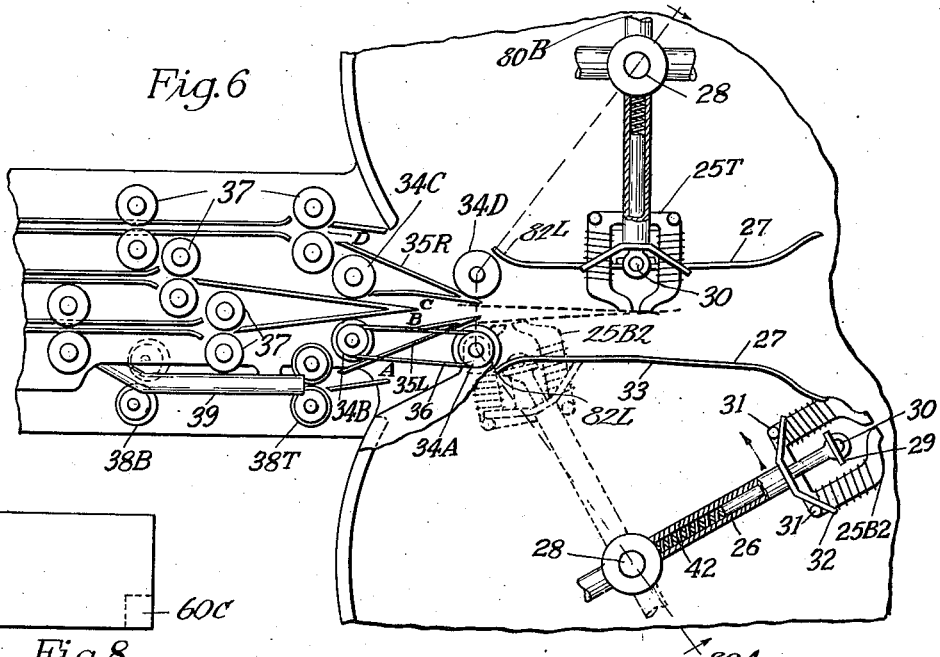
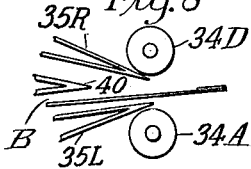
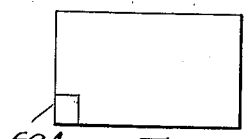
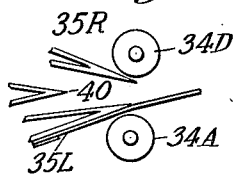
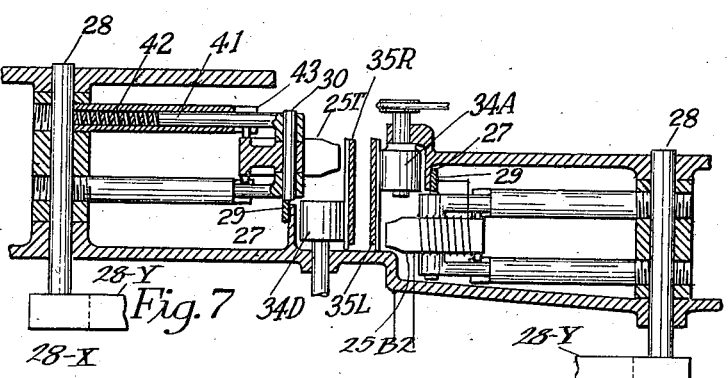
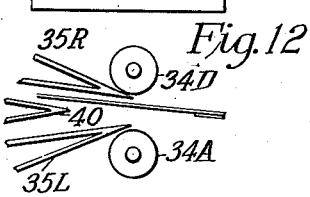
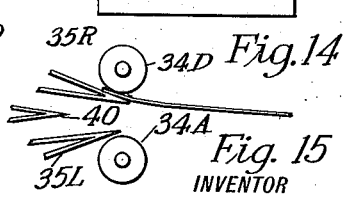
WITNESSES:
INVENTOR
Emil G. Hopp.
BY
ATTORNEYS E. G. HOPP.
MAIL SORTING, POSTMARKING, AND STAMP CANCELING DEVICE.
APPLICATION FILED FEB. 11 1914.

1,217,092. Patented Feb. 20, 1917.
5 SHEETS—SHEET 4.

WITNESSES:

INVENTOR
Emil G. Hopp
BY
Reed & Cook
ATTORNEYS

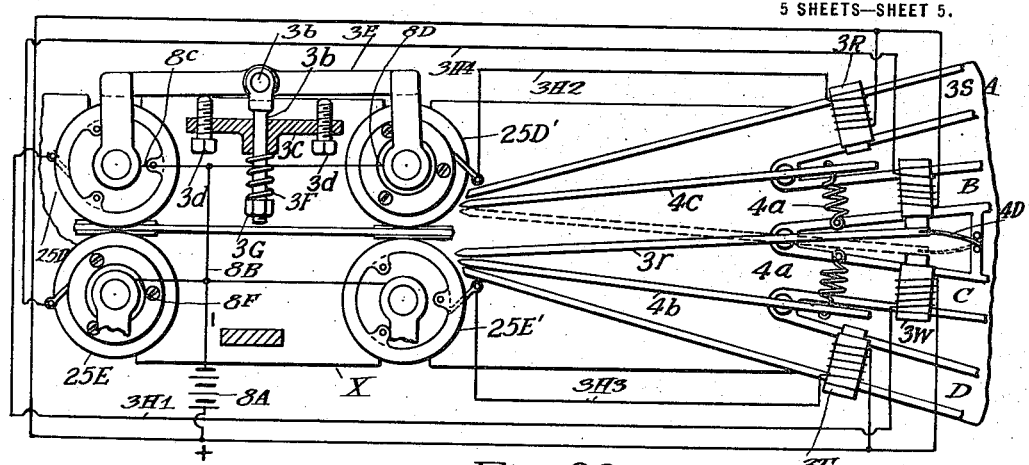

UNITED STATES PATENT OFFICE.

EMIL G. HOPP, OF SEATTLE, WASHINGTON.

MAIL-SORTING, POSTMARKING, AND STAMP-CANCELING DEVICE.

1,217,092.        Specification of Letters Patent.      Patented Feb. 20, 1917.

Application filed February 11, 1914. Serial No. 818,172.

*To all whom it may concern:*

Be it known that I, EMIL G. HOPP, a citizen of the United States, and a resident of the city of Seattle, in the county of King, State of Washington, have invented a new and useful Mail-Sorting, Postmarking, and Stamp-Canceling Device, of which the following is a full, clear, and exact description.

My invention is intended to receive the letters in a confused mass and through the combination of electrical, magnetic and mechanical devices, sort and postmark the letters and cancel the stamps thereon. The principle involved to accomplish this result and the novel means by which it is carried into execution, is the treating of the Government stamp metallically so that magnetic or electical means will act upon it.

This departure from a purely paper stamp by the Government would simply necessitate a change of process in making the stamps. The additional cost would be hardly computable.

The introduction of the metallically treated stamps on the mail pieces provides the means of closing an electric circuit to magnets, and by other mechanical means the mail pieces are sorted by the attraction of the stamps thereon. In the form preferred by me I have shown the metallically treated stamps adapted to close an electric circuit to magnets in passage between metallic rings connected to said magnets. The location of the stamps in passage therebetween predetermine the circuit closed to the respective magnets which are adapted to actuate gates to guide ways into which the respective mail pieces enter. In the alternative construction the metallically treated stamps perform the function of closing a magnetic circuit by coming in proximity with rotatably mounted electro magnets which attract the stamps, thereby advancing the mail pieces into respective guide-ways.

Having thus indicated the ends sought by me, my invention consists in the construction and combination of parts to be more fully described hereafter and particularly set forth in the claims. Reference is to be had to the accompanying drawings forming a part of the specification in which similar characters of reference indicate corresponding parts in all the figures.

Figure 1 is a top view of the machine.

Fig. 2 top view of rear end of the canceling machine.

Fig. 3 is a side view of the feed rollers.

Fig. 6 is a top view of the magnets in part section, showing their position when the mail piece is released.

Fig. 7 is a longitudinal sectional view of magnets, the arms, and shaft upon which they are mounted.

Figs. 8 and 9, 10 and 11, 12 and 13, 14 and 15, show the relative positions of the stamps on the mail pieces, and the respective guide-ways into which they enter.

Figure 16:
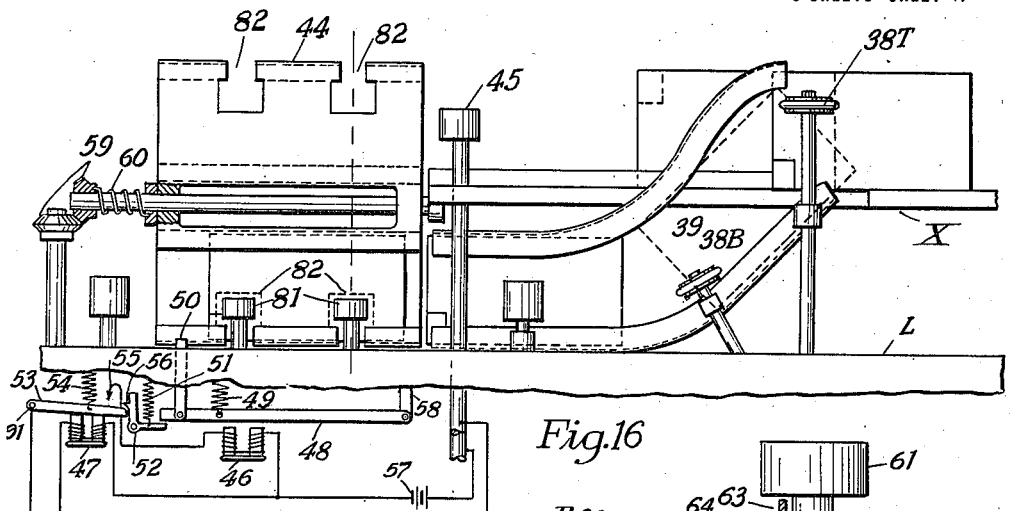

Fig. 16 is a side view of down guide-ways and mail piece turner.

Figure 17:
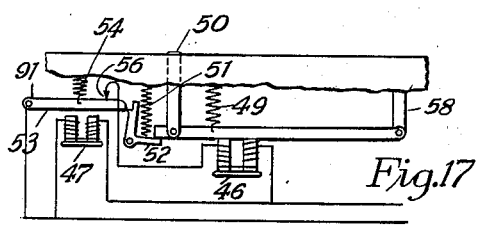

Fig. 17 shows the armature drawn down, and trip device for releasing same.

Figure 18:
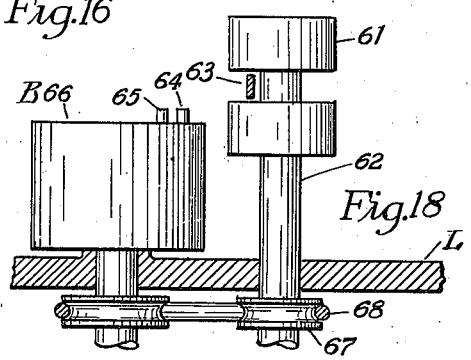

Fig. 18 is a side view of canceling hub and trip roller.

Figure 19:
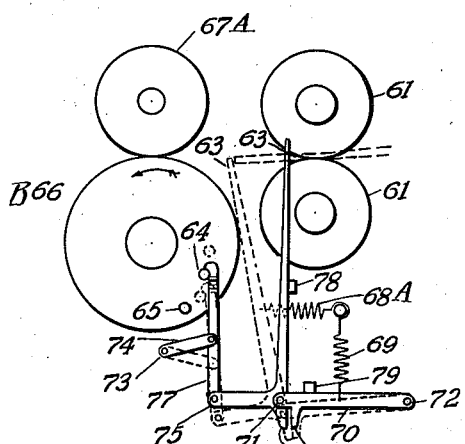

Fig. 19 shows top view of trip mechanism for canceling stamp at rear of mail piece.

Figure 20:
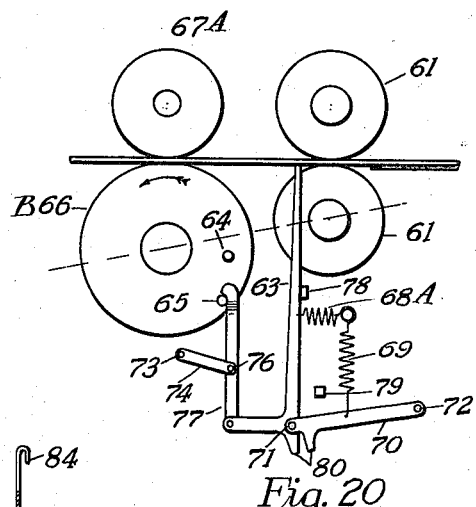

Fig. 20 shows top view of trip mechanism for conceling stamp with trip against face of mail piece.

Figure 21:
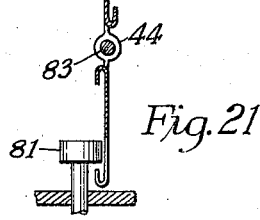

Fig. 21 is end view of mail piece turner, showing clips for retaining the mail pieces.

Fig. 22 is a top view of the sorting device, showing the electro mechanism for shifting the gates.

Fig. 23 is a sectional view of the sorting rollers.

Figs. 24 and 25, show a plurality of gates and two relative positions assumed when the mail pieces are to be received therein.

Figs. 26, 27, 28 and 29, show the four positions occupied by the stamps on the mail pieces.

Having thus indicated the ends sought by me, I will proceed to describe in detail the way in which I have carried out my invention in practical form. It is to be understood that various equivalents exist for independent elements. I have illustrated such as will carry into effect the functions and aims of my invention, namely, the action of the metallically treated stamp in closing an electric circuit to magnets, which actuate the gates and switches the mail pieces into their respective guide-ways, or the alternative of closing a magnetic circuit through magnets to act directly or indirectly on metallically treated stamps and carry the mail pieces thereof to respective guide-ways.

Figure 4:
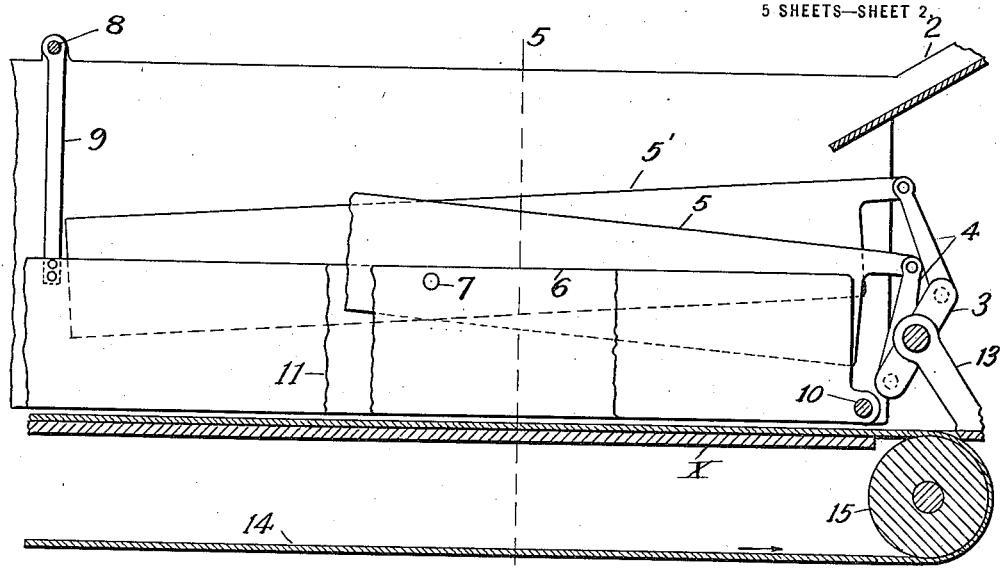
Fig. 4 is a longitudinal sectional view of Fig. 1, cut along line 4—4, showing side view of edger plates, cranks, part of chute from hopper.
Figure 5:
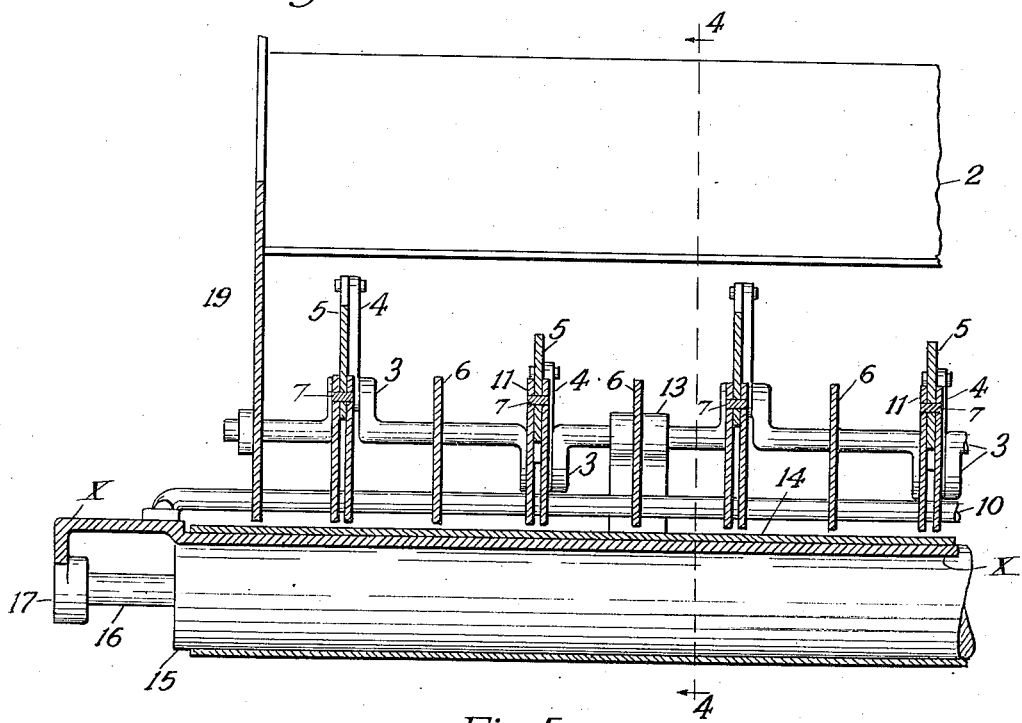
Fig. 5 is a transverse sectional view of Fig. 1, cut along line 5—5, showing end view of edger plates, stationary guide plate, and double guide plates.

In Fig. 1, X represents the frame of the machine, and 19 Fig. 5, the support upon which is mounted the hopper chute 2, for the mail pieces, which may be stationary or vibrated horizontally by a connecting rod, fulcrumed to a crank, or otherwise. Underneath the hopper I have provided a series of edger plates, 5, as shown in Figs. 4 and 5. These edger plates extend longitudinally in relation to the frame of the machine, and are operated by rods, 4, which are pivotally attached to the upper extensions of the edger plates and to a crank shaft, 3. This crank shaft is in turn mounted within bearings, 13, secured rigidly to the frame of the machine. Near the center of the edger plates is a transverse rod, 7, extending through the vibrating edger plates, 5, and the double guide plates, 11, and acts as a pivotal mounting for said plates. It can be observed when power is applied to the driving gear, 12, Fig. 1, the crank shaft 3 is rotated and an ocillating movement is thereby imparted to the edger plates, 5, alternatingly, which rock violently enough to toss mail pieces so that they will fall on edge between stationary plates, 6 and 11. These stationary plates run parallel with the others and are supported by rods, 9 and 10, to the frame of the machine. Just beneath the stationary plates is the movable belt 14 which extends across the entire width of the hopper, and is mounted in the usual way upon a pulley 15 on shaft 16 journaled in bearings 17.

As soon as letters come in contact with the movable belt they are carried forward thereon. The stationary plates serve to keep them in an upright position while in transit and from being crushed by the vibrating edger plates. Upon reaching rod 8, Fig. 4, any mail piece standing on end will be knocked down horizontally and proceed thence onward between guide plates, 21, which keep the mail pieces on edge and sheer them all in one common guide-way where they are assisted in transit by a vertical belt, 20, which is supported on two vertical pulleys, 22 and 23, respectively. A separator, 24, of well known construction, is yieldingly mounted at the terminus of the belt, which serves to permit the mail pieces to be advanced consecutively therethrough to the sorting rolles 25—D and 25—E as shown in Fig. 22. These sorting rollers are self-adjusting, to accommodate different thickness of mail pieces, and are pivoted at 3—a on a fork rod, 3—b, which passes through plate 3—C, which plate is securely attached to the frame X, Fig. 22. Set screws, 3—d, are adapted to adjust the distance between sorting rollers 25—D and 25—E and 25—D' and 25—E'. It can be observed that the arm 3—E is drawn against set screws 3—d by spring 3—f, which produces a yielding contact therewith. This contact is regulated by the nut 3—G which controls the expansive energy of the spring. In Fig. 23 the sorting rollers 25—D and 25—E show a sectional view thereof and 3—P shows hard rubber insulation, which is grounded on the shafts 8—C, 8—D, 8—E and 8—F of the sorting rollers, thence through said shafts to rings 3—W on sorting rollers. These rings are located on sorting roller 25—D at the top half thereof and on sorting roller 25—D' on the bottom half thereof, on 25—E' at the top half, and on 25—E at the bottom half thereof, thus if a mail piece enters between sorting rollers 25—D and 25—E and the stamp occupies the position on mail piece as shown by 60—C Fig. 26, it closes circuit through the rings 3—L and 3—W on sorting roller 25—E thence through bolt 3—M and commutator 3—K and brush 3—J to wire 3—H4, thence through magnet 3—S, and back to source of supply. It can be readily understood that the electric energy to magnet 3—S attracts the armature which is rigidly attached to the fulcrum of gate 3—r and throws it to the position in Fig. 22 thereby opening guide-way B.

If a mail piece enters between sorting rollers 25—D and 25—E and the stamp occupies the position thereon as shown by 60—A, Fig. 29, it does not close the circuit on sorting roller 25—D as the stamp passes under the rings thereof and advances between sorting rollers 25—D' and 25—E' closing the circuit through rings 3—L and 3—W on sorting roller 25—D' and through the wire 3—H2, thence through magnet 3—R and back to source of supply. The electric energy to magnet 3—R attracts the armature which is rigidly attached to the fulcrum of the gate 4—C and throws it in the position as shown in Fig. 25 thereby opening guide-way A.

If the stamp occupies the position on a mail piece as shown by 60—D Fig. 28 it enters between sorting rollers 25—D and 25—E and the stamp passes above rings 3—L and 3—W and advances to sorting rollers 25—D' and 25—E' closing circuit across rings 3—L and 3—W on sorting roller 25—E' thence through circuit as aforesaid out to wire 3—H3 to magnet 3—T and back to source of supply. The electric energy to magnet 3—T thus attracts the armature which is rigidly attached to the fulcrum of the gate 4—b and throws it in position as shown in Fig. 24 thereby opening guide-way D.

If the stamp occupies position on a mail piece as shown at 60—B Fig. 27, it enters between sorting rollers 25—D and 25—E, and the stamp now closes circuit across rings 3—L and 3—W on sorting roller 25—D, thence through aforesaid circuit to wire 3—HI, thence through magnet 3—W and back to source of supply. The electric energy to magnet 3—W attracts the armature which is rigidly attached to the fulcrume of the gate 3—r and throws it to the position as shown in dotted lines, Fig. 22, thereby opening guide-way C.

It can be readily seen that the spring 4—a holds gates 4—C and 4—b in position as shown in Fig. 22 when not acted upon by magnets 3—R and 3—T, and the spring 4—D holds the gate 3—r in a central position when not acted upon by magnets 3—S or 3—W.

In the alternative sorting device as illustrated in Fig. 6, the mail pieces are advanced consecutively through the separator 24 to the electro-magnets, 25—B2 and 25—T. These magnets are constructed of a horseshoe design on a pivot, 30, allowing the magnets thereby to swing when guide shoe, 29, comes in contact with guide rod, 27. When the magnet has left the guide rod 27, spring 42, acting on arm, 41, within a telescopic sleeve 43 forces the magnet out until pins, 31, Fig. 6, come in contact with shoulder, 32, thus holding the face of the magnets in parallel relation to the guide rods, 27, while making the revolution round to the other end thereof. Electric power is supplied to the magnets through guide shoe, 29, and guide rod, 27, or through communicating commutator rings fastened to shafts, 28, and properly insulated. The telescopic sleeves 42 upon which the magnets 25—T and 25—B2 are mounted are rigidly attached to the shafts 28. These shafts are rotated in the direction of arrows 80—A and 80—B, preferably by belts 28—Y actuating the pulleys 28—X from a source of power (not shown) and the rotative speed thereof is graduated to equal that of the speed rollers 37.

It can be readily seen when the magnets come in line with the metallic stamps on the mail pieces heretofore described, each respective magnet draws its companion mail piece firmly to its face and advances them to their respective guide-ways, according to the position of the stamps on the mail pieces, as shown in Figs. 8 and 9, 10 and 11, 12 and 13, 14 and 15, to be hereinafter described.

Fig. 6 shows the magnet, 25—B2, just before contact with the guide rod 27 and dotted lines of magnet 25—B2 shows its position just before releasing the mail piece 60—A. It is to be observed that an outward curvature 82—L is provided on the releasing end of guide rod, 27, to insure an outward thrust to mail piece 60—A, as shown in Fig. 11, where it enters between roller 34—A and guide 35—L advancing it into guide-way A, as shown in Fig. 11. Likewise magnet 25—B2, shown in dotted lines, controls the mail piece having the stamp at the bottom and rear thereof as shown at 60—C, Fig. 8, where it enters into opening 40, as shown in Fig. 9. For the purpose of insuring an outward thrust of the mail piece while the magnet has contact with the stamp in this position, a slight inclination 33, of the guide rod 27, is preferably provided which causes the mail piece to be thrust into guide-way B.

The upper illustration of the magnet 25—T in Fig. 6 shows its contact with the stamp 60—B acting through the mail piece. Said stamp is in the position on the mail piece as illustrated in Figs. 12, and 13, with the stamps at the rear and top thereof, the corresponding action takes place as herein described in 60—C, which causes the mail piece to be thrust into opening 40, and advanced into guide-way C. Likewise magnet 25—T controls mail piece with stamp at 60—D as shown in Fig. 14, where the corresponding action takes place as herein described in 60—A, which causes the mail piece to be thrust between roller 34—D and guide 35—R into guide-way D as shown in Fig. 15. Hence can be observed from the description of the two relative positions of the magnets as illustrated, the way in which each mail piece is thrust into predetermined guide-ways, determinable by the position of the stamp thereon. The rollers, 37, are so located in the respective guide-ways as to keep the mail pieces in transit at a predetermined speed. These rollers are mounted upon shafts, one of which has a universal joint 88, as shown in Fig. 3, and is adapted to be yieldingly mounted on bearing 87, and guide 85, and held in position by spring 86. It is to be understood that the mail pieces in the upper guide-ways, D and C, have to be turned over for their stamps to be acted upon by the canceling die, hence the provision of the mechanism as shown in Fig. 16; as will be hereinafter described.

Mail pieces in guide-ways A and B are advanced down inclines consecutively by roller, 38—T, which is provided with a rubber band around its periphery and located near the top of the slotted guide-way, so as to thrust the mail piece downwardly therein where it is acted upon by roller 38—B set at an angle near the bottom of the guideway, which acts likewise as herein shown, and advances it in a straight line to the canceling die. The mail pieces traveling in guide-ways D and C are advanced to turner 44—A and 44—B respectively.

This letter turner, 44, as shown in Fig. 16, is provided with clip guide-ways 84 for the mail pieces to be advanced therein from the respective guide-ways by feed rollers. Two notches, 82, are provided in the top and bottom, to allow passage past rollers 81, when the mail piece is out of turner 44. This turner is pivotally mounted upon a shaft 83 and operated by a friction gear, 59, and held by spring, 60. The trip, 50, which is held in position by spring 49, and which releases and engages the turner, is controlled by trip rollers, 45, which close an electric circuit from the source of supply 57 through magnets 46. 47, when said rollers are together, and thereby draws down armature 53 mounted on pivot 91, but as soon as a mail piece enters between the rollers, 45, the circuit is broken and magnet 47 releases armature 53, Fig. 17 and spring 54 draws up said armature 53 to make contact with point 55 of said electric circuit, and rests on shoulder 56. When the mail piece passes out of rollers 45, and has entered the turner 44, rollers 45, which are insulated on the shafts, again close the electric circuit, and magnet 46 now acts on armature 48 which is pivoted on the rod 58 and draws it down, also drawing down trip 50, thus leaving turner 44 free to turn the mail piece, at same time armature 48 strikes trip 52, which is held in place by spring 51, thereby releasing armature 53, which is now acted on by magnet 47 and is drawn down, thus breaking the circuit to magnet 46 and releasing armature 48, which is drawn up with trip 50 to check turner 44 by spring 49. The rollers 81 then advance the mail pieces toward postmarking and canceling die. In Fig. 19 trip lever 63 pivotally mounted on lever 70 at 71 is held in position against stop 78 by spring 68—A. The projection 80 of the lever 63 and arm 70 respectively serve to prevent swinging motion to the lever 63 in its tilted position. The spring likewise communicates pressure to lever 77, which is pivoted to the lever 63, holding the catch on the end thereof on the pin 64, thereby preventing the post marking and canceling die from revolving until the mail piece enters between rollers 61, which would move lever 63 in position of dotted line as shown in Fig. 19. This action releases pin 64, and the die will revolve until catch strikes pin 65. The die is arrested thereby and held in position as shown in Fig. 20 with trip 63 against the face of the mail piece until the end of said mail piece passes trip 63, which then snaps back to its normal position as shown in Fig. 19 so as to allow pin 65 to pass thereunder and the die makes the revolution and is again arrested by lever 77 and pin 64.

It is to be readily seen that these mail pieces in A and B guide-ways drop down slightly a little more than their height, so that the mail pieces in guide-ways D and C are directly over them.

The speed of all the mail pieces is accurately graduated by the advancing rollers, so that each mail piece keeps its relative distance in advance of the one following, regardless of the guide-way within which it is traveling: For instance, the mail piece in guide-way C, is spaced about one inch in advance of the letter in guide-way B when it enters the turner 44—B, Fig. 2, where it is turned upside down, so that all mail pieces going to canceling die B—66 will have the stamps thereon at the back and bottom facing canceling die B—66. Likewise the mail pieces from guide-way A, have traveled the down chute 39, and crossed over underneath the frame, X to left, in line and under guide-way D. As the stamp of the mail piece entering guide-way A is at the front and bottom thereon, it need not be turned for the cancellation of the stamp. The mail piece entering guide-way D, the stamp being at front and top, has to be turned, hence it is thereby advanced to turner, 44—A, where the action takes place, and the mail piece is dropped into the guide-way A, on the lower platform L, shown in Fig. 16. The letter in guide-way C is advanced to the turner 44—A where the action takes place and is dropped into guide-way B on lower platform L. Thus all letters in guide-ways A and D are now in guide-way A and all letters from guide-ways B and C are in guideway B lower platform L. It can be readily seen that the canceling post-marking die A—66, post marks and cancels the stamps on the front and bottom of mail pieces traveling in guide-way A, and canceling die B—66, post marks and cancels the stamps at the rear and bottom of mail pieces traveling in guide-way B from whence they are passed onto a stacker of any well known construction.

The post marking and canceling die as shown in Fig. 18, consists of a double trip roller 61 mounted on shaft 62 rotating within bearing on frame L. A pulley 67 mounted on said shaft is actuated by belt 68 having contact with a similar pulley mounted on the shaft of the die B—66. The post marking and canceling die A—66 as shown in Fig. 2, is of well known construction.

The printing pressure roller 67—A Fig. 19 is a well known form of construction yieldingly mounted opposite die to insure perfect impression of post mark, and cancellation of the stamp.

Having thus indicated the ends sought by me, what I claim as new and desire to protect by Letters Patent, is;

1. In a mail sorting device, a mail sorting mechanism adapted to receive mail pieces, rollers adapted to advance said mail pieces in an upright position, said mail pieces being provided with metallically treated stamps, a plurality of magnets, an electric circuit connecting said magnets, said metallically treated stamps on said mail pieces adapted to close said electric circuit to said magnets independently and predetermine the selective magnet to which said circuit is closed by the location of said stamps, a plurality of gates, each respectively provided with an armature for actuating said gates by the attraction of said magnets, thereby predetermining the guide-way into which said mail pieces enter.

2. In a mail sorting device, a mail sorting mechanism adapted to receive mail pieces, rollers adapted to advance said mail pieces in an upright position, said mail pieces being provided with metallically treated stamps, a plurality of magnets, an electric circuit connecting said magnets, said metallically treated stamps on said mail pieces adapted to close said electric circuit across two points on an open circuit to said magnets and predetermine selective magnets to which said circuit is closed by the location of said stamps, a plurality of gates, armatures connecting said gates and controlling the movement thereof by the attraction of said magnets, thereby predetermining the guide-way into which said mail pieces enter.

3. In a mail sorting device, a mail sorting mechanism adapted to receive mail pieces, rollers adapted to advance said mail pieces in an upright position, said mail pieces being provided with metallically treated stamps, a plurality of magnets, an electric circuit connecting said magnets, said metallically treated stamps on said mail pieces adapted to close said electric circuit across metallic rings connected to said magnets and predetermine the selective magnet to which said circuit is closed by the location of said stamps, a plurality of gates, armatures connecting said gates and controlling the movement thereof by the attraction of said magnets, thereby predetermining the guide-way into which said mail pieces enter.

4. In a mail sorting device, a mail sorting mechanism adapted to receive mail pieces, rollers adapted to advance said mail pieces to guide ways in an upright position, said mail pieces being provided with metallically treated stamps, a plurality of electro-magnets, an electric circuit connecting said electro-magnets, said metallically treated stamps on said mail pieces adapted to close one circuit only said electro-magnets in passing, a plurality of gates, armatures connecting said gates and so disposed as to control the movement thereof by the attraction of said electro-magnets as and in the manner set forth.

5. In a mail sorting device, a sorting mechanism comprising a series of speed rollers adapted to keep the mail pieces in transit in guide-ways at a graduated speed, means of conducting the mail pieces of two guide-ways directly to their respective canceling dies, means of turning the mail pieces of two guide-ways and transposing them into the companion guide-ways of the mail pieces unturned to travel uniformly with the mail pieces in transit therein to the respective canceling dies.

6. A mail sorting device, in combination with a sorting mechanism a series of speed rollers adapted to keep the mail pieces in transit in guide-ways at a graduated speed, means of conducting the mail pieces of two guide-ways directly to their respective canceling dies, turners adapted to receive the mail pieces of two guide-ways, means of actuating said turner and means for controlling the action thereof to transpose the mail pieces therein into companion guide-ways of the mail pieces unturned to travel uniformly with the mail pieces in transit therein to the respective canceling dies.

Signed by me at Seattle, Washington, this 5th day of February, 1914.

EMIL G. HOPP.

Witnesses:
JOHN B. CARWILE,
ROBERT W. REID.